United States Patent
Marsh (10) Patent No.: US 9,519,985 B2
(45) Date of Patent: Dec. 13, 2016

(54) GENERATING MOBILE-FRIENDLY ANIMATIONS

(71) Applicant: TreSensa Inc., New York, NY (US)

(72) Inventor: Oliver Marsh, San Francisco, CA (US)

(73) Assignee: TreSensa Inc., New York, NY (US)

( * ) Notice: Subject to any disclaimer, the term of this patent is extended or adjusted under 35 U.S.C. 154(b) by 158 days.

(21) Appl. No.: 14/463,898

(22) Filed: Aug. 20, 2014

(65) Prior Publication Data

US 2015/0054834 A1 Feb. 26, 2015

Related U.S. Application Data (60) Provisional application No. 61/867,840, filed on Aug. 20, 2013.

(51) Int. Cl.
*G06T 13/80* (2011.01)
*G06T 13/00* (2011.01)

(52) U.S. Cl.
CPC .......... *G06T 13/00* (2013.01); *G06T 2213/12* (2013.01)

(58) Field of Classification Search
CPC .............................. G06T 13/00; G06T 2213/12
See application file for complete search history.

(56) References Cited

U.S. PATENT DOCUMENTS

| | | | | |
|---|---|---|---|---|
| 8,493,354 | B1* | 7/2013 | Birnbaum | G06F 3/016 340/407.2 |
| 2007/0153004 | A1* | 7/2007 | Airey | G06T 13/00 345/473 |
| 2008/0043203 | A1* | 2/2008 | Jacobs | G03B 35/16 352/63 |
| 2010/0066914 | A1* | 3/2010 | Sato | G06T 3/4007 348/699 |
| 2012/0013796 | A1* | 1/2012 | Sato | H04N 7/0127 348/441 |
| 2012/0139952 | A1* | 6/2012 | Imai | G09G 5/34 345/672 |
| 2012/0249550 | A1* | 10/2012 | Akeley | H04N 5/232 345/419 |
| 2014/0092128 | A1* | 4/2014 | Nakamura | G09G 5/377 345/629 |

* cited by examiner

*Primary Examiner* — Sultana M Zalalee
(74) *Attorney, Agent, or Firm* — Lowenstein Sandler LLP (57) ABSTRACT

Systems and methods are disclosed for generating mobile-friendly animations. In one implementation, a processing device receives a first animation in a first format, the first animation including one or more of graphical components. The processing device processes the first animation to identify, with respect to the first animation, one or more animation instructions. The processing device generates, based on the first animation and the one or more animation instructions, a second animation in a second format, the second animation including (a) one or more components that correspond to the plurality of graphical components and (b) one or more animation instructions.

16 Claims, 4 Drawing Sheets

GENERATING MOBILE-FRIENDLY ANIMATIONS

CROSS-REFERENCE TO RELATED APPLICATION

This application is related to and claims the benefit of U.S. Patent Application No. 61/867,840, filed Aug. 20, 2013, the entirety of which is incorporated herein by reference.

TECHNICAL FIELD

Aspects and implementations of the present disclosure relate to data processing, and more specifically, to generating mobile-friendly animations.

BACKGROUND

Various file formats and/or platforms (such as Adobe® Flash®) are commonly used to generate animations. However, the use of such formats/platforms may result in suboptimal results or inefficiencies in certain contexts or settings.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a first animation in a first format, the first animation including one or more of graphical components. The processing device processes the first animation to identify, with respect to the first animation, one or more animation instructions. The processing device generates, based on the first animation and the one or more animation instructions, a second animation in a second format, the second animation including (a) one or more components that correspond to the plurality of graphical components and (b) one or more animation instructions.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to generating mobile-friendly animations. The systems and methods disclosed can be applied to digital media content such as animations, images, video, and/or any other such content, such as digital content that can be created and/or incorporated into an application or 'app.' More particularly, it can be appreciated that while software developers (e.g., game developers) can gravitate towards certain file formats and/or development platforms, such formats/platforms may not be advantageous under all circumstances. Moreover, a file format or development platform that may be advantageous for one type or class of device (e.g., a desktop computer) may not be advantageous for other types/classes of devices (e.g., mobile devices). For example, for various reasons (e.g., due to tools available, comfort/familiarity with the platform, primary concern with desktop implementation, etc.) many game developers develop game animations using Adobe® Flash®) ('Flash'), despite the fact that this format is often suboptimal in many scenarios (e.g., on mobile devices). Moreover, while various technologies enable the export of such animations through the use of 'sprite sheets' (as are known to those of ordinary skill in the art), such approaches can result in relatively large image files (such as in scenarios where a number of animations are involved) and other inefficiencies.

Accordingly, described herein are technologies that enable the conversion of animations/animation sequences in one digital format into animation data in another digital format. That is, the various elements that make up animations generated in a first format (e.g., Flash) can be processed and thereby converted into corresponding elements in a second format. Additionally, an animation data file can be generated, containing instructions that dictate the manner in which the converted animation elements (e.g., images) are to be arranged/configured in order to reproduce the original animation(s). In doing so, a game developer can create animations within an environment that is most comfortable/familiar to him/her, while enabling the conversion/export of such animations into components/elements that can be subsequently incorporated into other platforms and/or formats, such as platforms that may be advantageous in certain contexts such as on a mobile device (e.g., HTML5).

Figure 3:
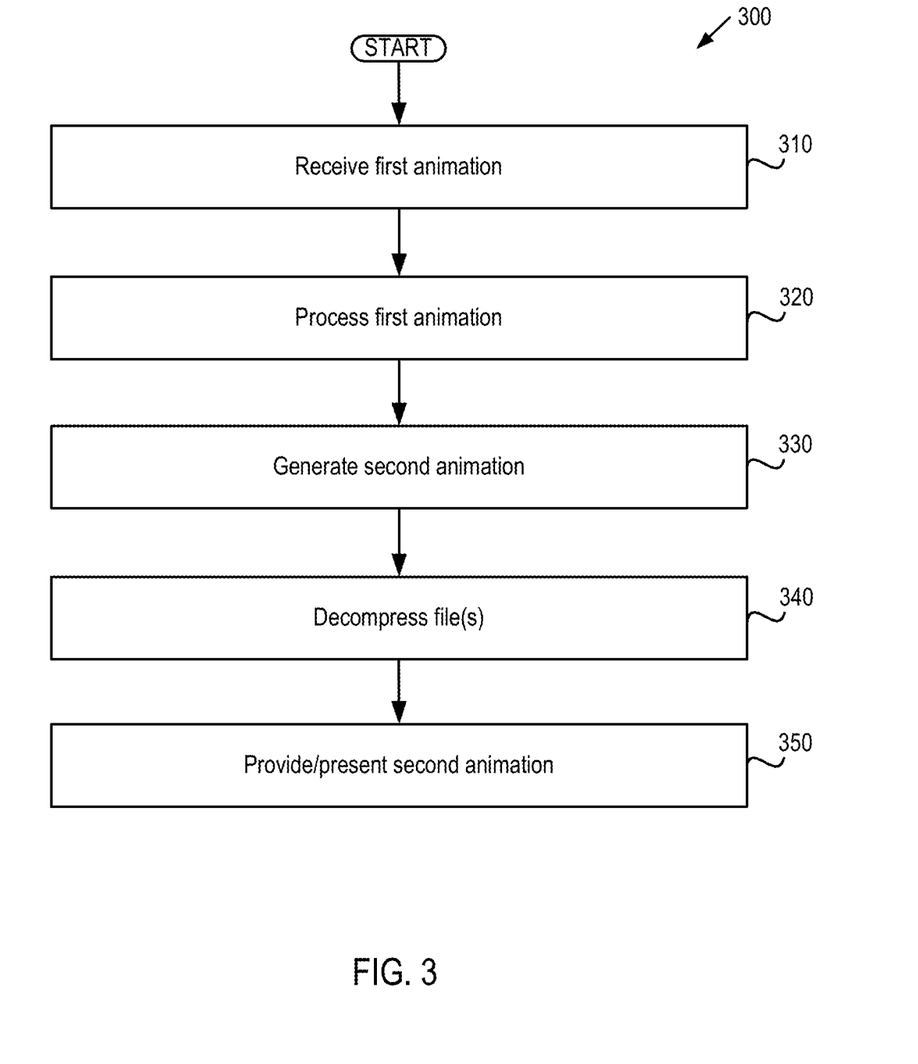
FIG. 3 depicts a flow diagram of aspects of a method for generating mobile-friendly animations.

FIG. 3 depicts a flow diagram of aspects of a method 300 for generating mobile-friendly animations. The method is performed by processing logic that may comprise hardware (circuitry, dedicated logic, etc.), software (such as is run on a general purpose computer system or a dedicated machine), or a combination of both. In one implementation, the method is performed by one or more components, devices, and/or machines depicted in FIG. 4, while in some other implementations, one or more blocks of FIG. 3 may be performed by other components, devices, and/or machines (e.g., in a client-server configuration)

For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, an animation can be received. In certain implementations, such an animation can be in a first format (e.g., Flash). Moreover, in certain implementations such an animation can include one or more graphical components (e.g., vector images). In one aspect, block 310 is performed by one or more components, devices, and/or machines depicted in FIG. 4, such as processor 602 in conjunction with instructions 626.

As noted, in certain implementations, the referenced animations/animation sequences can be initially generated (e.g., by an animator or game developer) in a first format, such as Flash, that utilizes vector images (which may be referred to herein as 'original animations' for the sake of clarity). More specifically, such original animations can be generated by creating individual animation or graphical components/elements (e.g., elements that are present across a number of different animations/animation sequences), and arranging such components/elements to create the original animation(s). For example, with respect to multiple animation sequences that depict different movements of a particular game character (e.g., performing actions such as walking, running, jumping, etc.), it can be appreciated that multiple components (e.g., various body parts of the character) are present across each of the various animation sequences. Accordingly, each respective component (such as those corresponding to respective body parts/limbs of the character, e.g., arm, leg, head, etc.) can be created. In certain implementations, each of such animation objects can be created as respective 'movie clips' in Flash, such as in a manner known to those of ordinary skill in the art.

Figure 1:
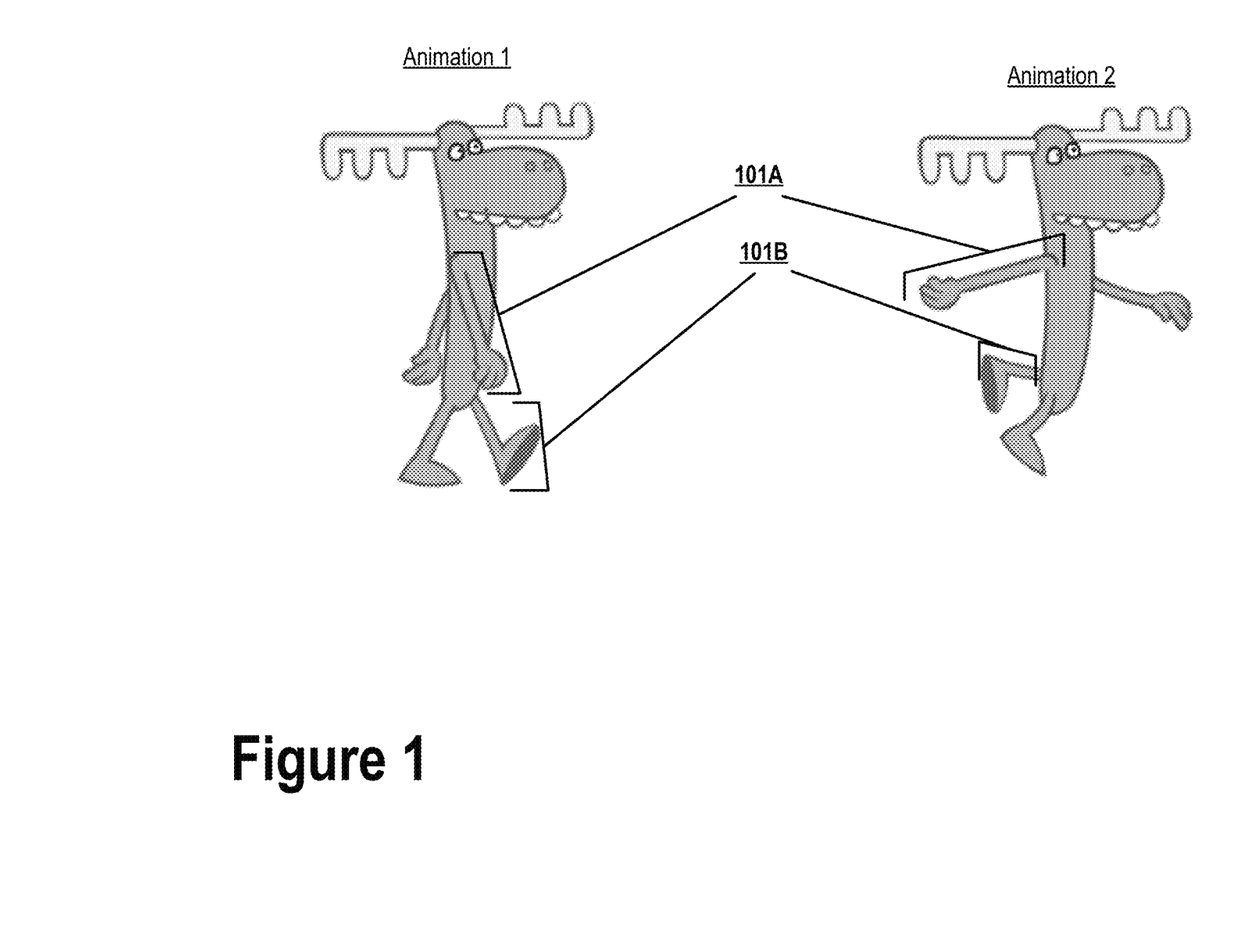
FIG. 1 depicts various animations, in accordance with one implementation of the present disclosure.

For example, it can be appreciated with reference to FIG. 1 that multiple animation sequences (e.g., 'Animation 1' and 'Animation 2,' as shown) can be generated as respective composites of various common components. By way of illustration, it can be appreciated that though 'Animation 1' and 'Animation 2' present two visually different animations, the respective animations actually incorporate a substantial number of common components, such as component 101A (the right arm of the character) and component 101B (the left leg of the character), among others. Using one or more image/animation authoring tools (as are known to those of ordinary skill in the art) a user can create such components (which can be, for example, vector graphics) as 'movie clips' in Flash and also provide respective identifiers for each image (e.g., a label or tag identifying each body part, which can, for example include an ActionScript linkage).

Moreover, in certain implementation the referenced animations can also incorporate or otherwise include various interaction parameters. Such interaction parameters may be associated or otherwise linked to various graphical components that make up the animation. That is, it can be appreciated that, in addition to their visual characteristics, certain animations may have various interactive properties. For example, certain animations (e.g., animations that correspond to menu buttons, controls, etc.) may be configured to initiate various commands or take various actions in response to a particular interaction (e.g., a selection of, clicking on, tapping of, etc., the animation and/or a region thereof). Accordingly, it should be understood that such 'interactive' animations may incorporate various interaction parameters which define or otherwise dictate such interactions and the operations, commands, actions, etc., to be taken in response to a selection of the animation and/or a portion or segment thereof. As described herein, such parameters can also be considered and utilized in converting the animation.

At block 320, the animation (such as the animation received at block 310) can be processed. In doing so, various animation instructions can be identified or otherwise generated, such as with respect to the received animation. In one aspect, block 320 is performed by one or more components, devices, and/or machines depicted in FIG. 4, such as processor 602 in conjunction with instructions 626.

That is, having received the referenced original animation (e.g., a Flash animation) or a set of animations (e.g., 'Animation 1' and 'Animation 2,' as shown in FIG. 1) (such as at block 310), the original animation(s) can be processed in order to identify various related animation instructions that are encoded, embedded, and/or otherwise associated with such original animations. In doing so, one or more animations can be generated in an alternate animation format (which may be referred to herein as 'converted animations' for the sake of clarity), such as is described herein. In doing so, one or more of the components that make up the original animations (which, as noted, can be vector graphics) can be processed in order to generate corresponding converted components (which can be, for example, raster graphics), as well as instructions or parameters that correspond to various aspects of the original animations.

For example, in certain implementations the original animation (e.g., the animation received at block 310) can be processed to identify various operational characteristics. Such operational characteristics may be associated with various graphical components of the original animation (e.g., the animation received at block 310). In certain implementations, such operational characteristics can correspond to or otherwise one or more additional features, functionalities, or aspects that may be associated, for example, with one or more particular graphical component(s) of the original animation. That is, while certain graphical components may be relatively static (in that they are primarily simply presented visually during the course of a game—e.g., the arm or leg of a character), other graphical components may be associated with various characteristics, parameters, etc., that may reflect various aspects of the particular component (and which may change during the course of a game). By way of illustration, a graphical component corresponding to a weapon (e.g., a gun) may be associated with various parameters that dictate, for example, the amount of ammunition remaining, interchangeability of the weapon, relative strength of the weapon, etc. As noted, such operational characteristics can be associated with or otherwise linked to one or more graphical components in the original animation. As such, such characteristics can be identified (e.g., in associated with the graphical component) when processing the original animation and maintained during the conversion process described herein.

Additionally, in certain implementations the original animation (e.g., the animation received at block 310) can be processed to identify various navigational characteristics associated with or otherwise reflected by first animation (e.g., the amount of relative distance within a game to be covered by a single pace of the character). That is, it can be appreciated that when implementing animations that correspond to movement (e.g., walking animations, climbing animations, etc.) within a game or application, it can be advantageous to configure various other aspects of the game or application such that they operate/are performed in a manner that is consistent with the navigational instructions associated with the animation. By way of illustration, one such navigational characteristic can dictate that five frames of a walking animation is to correspond to 2.5 navigational units (e.g., with respect to the navigation of a side-scrolling game). It can be appreciated that ensuring consistency between the animation and the movement/navigation of the game can increase the degree of 'realism' reflected by the game. By way of further illustration, another such navigational characteristic can reflect that the navigation associated with a climbing animation may not be strictly linear (e.g., certain parts of the climbing animation may proceed relatively more quickly with respect to an ascent/descent, while other parts of the climbing animation may proceed relatively more slowly). Accordingly, when processing an original animation (such as the animation received at block 310), such navigational characteristics can be identified and subsequently converted, thereby enabling the converted animations to better link or synchronize aspects of the animation with other navigational aspects of the game within which they are incorporated (e.g., the scrolling of the interface, etc.).

At block 330, a second animation can be generated. In certain implementations, such a second animation can be generated in a second format (e.g., a format different from the format of the animation received at block 310). Moreover, in certain implementations such an animation can be generated based on the original animation (e.g., the animation received at block 310, such as a Flash animation) and/or various animation instructions (such as those identified at block 320). In certain implementations, the referenced second animation can include various components, each of which can correspond to the various graphical components that make up the original animation. Additionally, in certain implementations the referenced second animation can include one or more animation instructions (which can correspond to the various instructions identified at block 320). In one aspect, block 330 is performed by one or more components, devices, and/or machines depicted in FIG. 4, such as processor 602 in conjunction with instructions 626.

Figure 2:
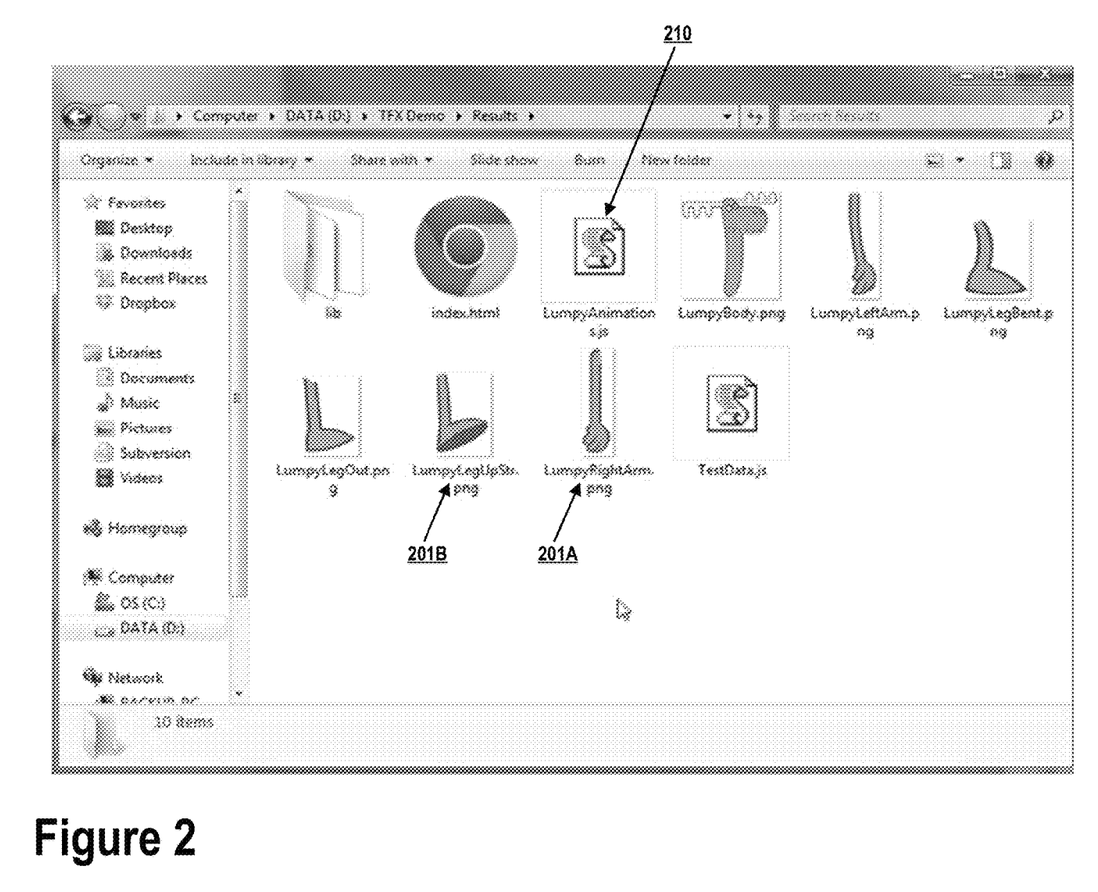
FIG. 2 depicts various animation components, in accordance with one implementation of the present disclosure.

For example, as shown in FIG. 2, component 201A has been generated to correspond to component 101A in FIG. 1, while component 201B has been generated to correspond to component 101B. In various implementations, such images can be generated as raster images. Moreover, in certain implementations one or more aspects of the scale factor and/or the decimal precision of such images can be customized and/or configured. It should be understood that doing so can enable a user to convert the original animations into file(s) that are relatively more precise/detailed (and thus may be relatively larger) or relatively less precise/detailed (and thus may be relatively smaller).

Additionally, as shown in FIG. 2, a corresponding JavaScript file 210 containing a JSON object can be generated. Such a file 210 can include information used for playback of the various converted animation(s) and/or various other related instructions and/or parameters such as those referenced herein. For example, file 210 can include instructions as to how the various components (e.g., 201A, 201B, etc.) are to be arranged, animated, etc., in various animations (e.g., an animation such as 'Animation 1' or 'Animation 2' as shown in FIG. 1). In doing so, a single instance of each of the various components (e.g., 201A, 201B, etc.) can be generated and/or transmitted, thereby enabling transmission of such animations in a considerably smaller file size (as compared to other techniques for converting animations). Moreover, file 210 can include keyframed animation data which can be utilized with respect to the playback of the various animations, such as in a manner known to those of ordinary skill in the art.

Moreover, in certain implementations the referenced second animation can be generated to also include various interaction instructions (which can be stored or incorporated within or otherwise referenced by JavaScript file 210). Such interaction instructions can, for example, be associated with one or more of the components of the second animation that correspond to the graphical components of the original animation (e.g., the animation received at block 310). Additionally, such interaction instructions can correspond to the interaction parameters identified at block 320 (which, as noted can correspond to the animation received at block 310). In doing so, the functionality, etc., associated with various animations (e.g., selectable buttons, menus, etc.) can be maintained throughout and subsequent to the described conversion process.

Additionally, in certain implementations the referenced second animation can be generated to also include various operational instructions (which can be stored or incorporated within or otherwise referenced by JavaScript file 210). Such operational instructions can, for example, be associated with one or more of the components of the second animation that correspond to the graphical components of the original animation (e.g., the animation received at block 310). Additionally, such operational instructions can correspond to the operational characteristics identified at block 320 (which, as noted can correspond to the animation received at block 310). In doing so, the functionality, etc., associated with various animations (e.g., selectable buttons, menus, etc.) can be maintained throughout and subsequent to the described conversion process.

Additionally, in certain implementations the referenced second animation can be generated to also include various navigational instructions (which can be stored or incorporated within or otherwise referenced by JavaScript file 210). Such navigational instructions can, for example, be associated with one or more of the components of the second animation that correspond to the graphical components of the original animation (e.g., the animation received at block 310). Additionally, such navigational instructions can correspond to the navigational characteristics identified at block 320 (which, as noted can correspond to the animation received at block 310). In doing so, the synchronicity between the progression of an animation and the navigation of a game can be maintained throughout and subsequent to the described conversion process.

In certain implementations, various components (e.g., of the second animation, such as that generated at block 330) that correspond to various graphical components (e.g., of the first animation, such as that received at block 310), and/or various associated/related animation instructions can be further compressed, such as into a binary zip file (or any other such binary and/or compressed file format). Moreover, in certain implementations the referenced binary zip file can be encoded, such as in base64 text (or any other such format), such as in a manner known to those of ordinary skill in the art. Additionally, in certain implementations one or more components that correspond to various graphical components and/or animation instructions (such as those referenced herein) can be converted into one or more text-compressed JSON object(s), such as in a manner known to those of ordinary skill in the art. Such further compression can be advantageous in context such as mobile gaming where bandwidth may otherwise be limited.

At block 340, a binary zip file (such as that generated at block 330) can be decompressed. In doing so, a second animation can be generated. In doing so, the various animations (as well as their associated instructions) can be deployed or otherwise utilized within a game or application. In one aspect, block 340 is performed by one or more components, devices, and/or machines depicted in FIG. 4, such as processor 602 in conjunction with instructions 626.

At block 350, the second animation (such as that generated at block 330 and/or 340) can be provided or otherwise presented, such as within a game or application. In one aspect, block 350 is performed by one or more components, devices, and/or machines depicted in FIG. 4, such as processor 602 in conjunction with instructions 626.

Moreover, in certain implementations the referenced second animation can be provided and/or presented based on the one or more navigational instructions (such as those generated at block 330). For example, as described herein, various aspects of the gameplay of a particular game (e.g., the scrolling speed of a navigational scene) can dictate the speed at which the animation is to be displayed. In doing so, presentation of the animation can be synchronized with the navigation/scrolling of the game, resulting in a more realistic gameplay experience.

It can be appreciated that by implementing one or more of the technologies described herein, animations originally created in a format such as Flash can be converted/exported into one or more other formats. In doing so, one or more files can be generated which can be considerably smaller in size as compared to the original animations. Such techniques can be particularly advantageous in settings such as mobile environments where bandwidth, storage, and/or processing resources can be relatively limited. Moreover, the converted/exported animation files can support animation playback that includes translation, rotation, non-uniform scaling, and skewing. In addition, by generating one or more converted animations using the technologies disclosed herein, such converted animations can be easily and efficiently imported or otherwise utilized in various settings and contexts. For example, using file 210 (e.g., a JavaScript file containing information used for playback of various converted animations) in conjunction with one or more JavaScript engines and/or libraries, a game developer can implement the converted animations (e.g., within a game) in a relatively efficient manner.

It should also be noted that while the technologies described herein are illustrated primarily with respect to generating animations in gaming contexts, the described technologies can also be implemented in any number of additional or alternative settings or contexts and towards any number of additional objectives.

Figure 4:
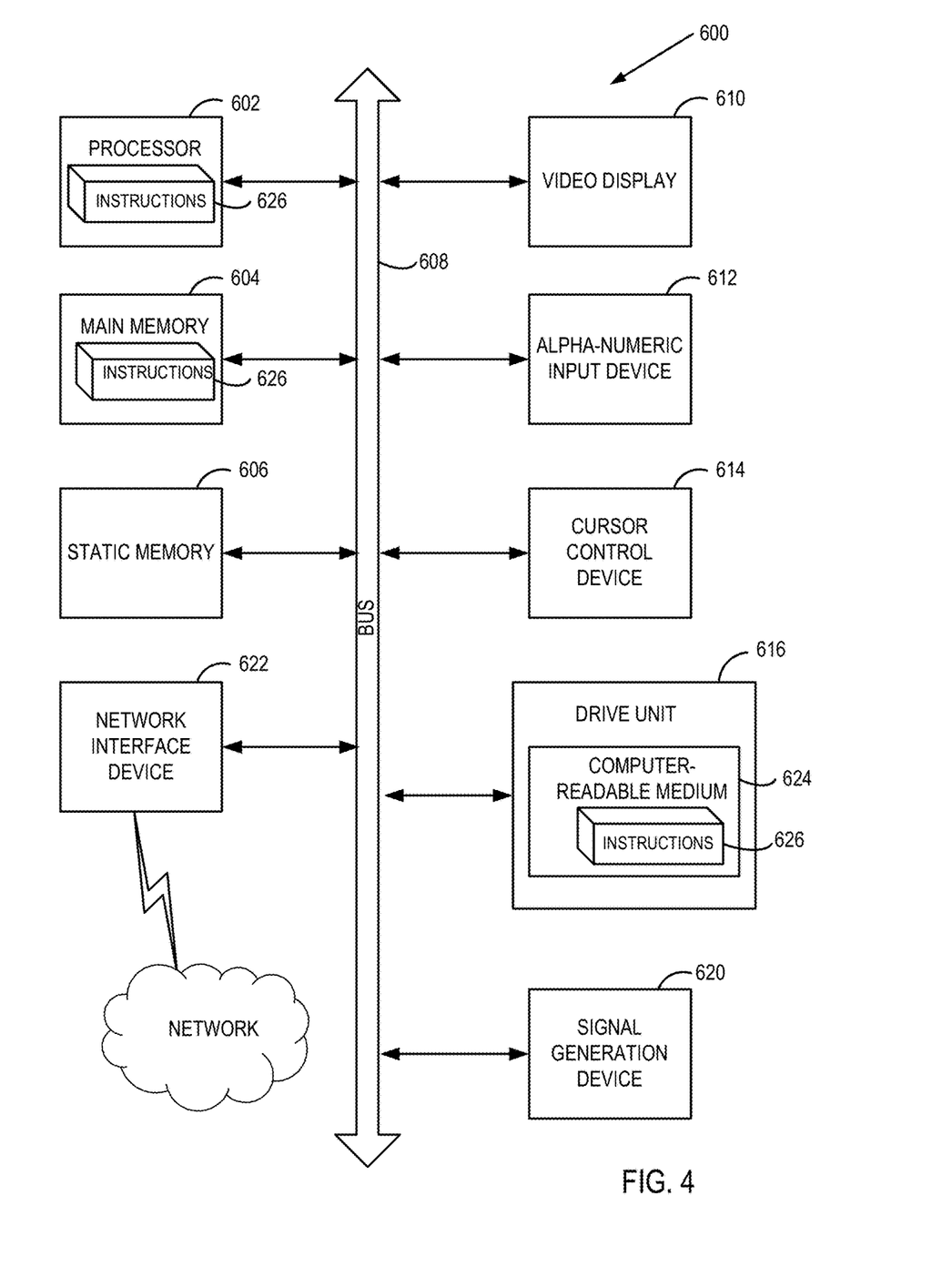
FIG. 4 depicts a block diagram of an illustrative computer system operating in accordance with aspects and implementations of the present disclosure.

FIG. 4 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a mobile or tablet computer, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "receiving," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
    receiving a first animation in a first format, the first animation comprising a plurality of graphical components;
    processing, by a processing device, the first animation to identify, with respect to the first animation, one or more animation instructions and one or more navigational characteristics, the one or more navigational characteristics comprising a quantity of frames of the first animation that correspond to a navigational unit within a game;
    based on the first animation and the one or more animation instructions, generating a second animation in a second format, the second animation comprising (a) one or more components that correspond to the plurality of graphical components and (b) one or more animation instructions;
    generating, based on the one or more navigational characteristics, one or more navigational instructions that synchronize a progression of the second animation with navigation within the game; and
    presenting the second animation based on the one or more navigational instructions.

2. The method of claim 1, wherein the first animation further comprises one or more interaction parameters, the one or more interaction parameters being associated with at least one of the plurality of graphical components.

3. The method of claim 2, wherein generating a second animation comprises generating a second animation in a second format, the second animation comprising (a) one or more components that correspond to the plurality of graphical components, (b) one or more animation instructions, and (c) one or more interaction instructions associated with at least one of the one or more components that correspond to the plurality of graphical components.

4. The method of claim 1, wherein processing the first animation comprises processing the first animation to identify, with respect to at least one of the plurality of graphical components, one or more operational characteristics.

5. The method of claim 4, wherein generating a second animation comprises based on the first animation, the one or more animation instructions, and the one or more operational characteristics, generating a second animation in a second format, the second animation comprising (a) one or more components that correspond to the plurality of graphical components, (b) one or more animation instructions, and (c) one or more operational instructions associated with at least one of the one or more components that correspond to the at least one of the plurality of graphical components.

6. The method of claim 1, wherein generating a second animation comprises compressing at least one of (a) the one or more components that correspond to the plurality of graphical components or (b) the one or more animation instructions into a binary zip file.

7. The method of claim 6, wherein generating a second animation further comprises encoding the binary zip file as base64 text.

8. The method of claim 6, wherein at least one of (a) the one or more components that correspond to the plurality of graphical components or (b) the one or more animation instructions comprise a text-compressed JSON object.

9. The method of claim 6, further comprising:
    decompressing the binary zip file to generate the second animation; and
    providing the second animation.

10. A system comprising:
    a memory; and
    a processing device, coupled to the memory, to:
    receive a first animation in a first format, the first animation comprising a plurality of graphical components;
    process the first animation to identify, with respect to the first animation, one or more animation instructions and one or more navigational characteristics, the one or more navigational characteristics comprising a quantity of frames of the first animation that correspond to a navigational unit within a game;
    generate, based on the first animation and the one or more animation instructions, a second animation in a second format, the second animation comprising (a) one or more components that correspond to the plurality of graphical components and (b) one or more animation instructions;

generate, based on the one or more navigational characteristics, one or more navigational instructions that synchronize a progression of the second animation with navigation within the game; and present the second animation based on the one or more navigational instructions.

11. The system of claim 10, wherein the first animation further comprises one or more interaction parameters, the one or more interaction parameters being associated with at least one of the plurality of graphical components.

12. The system of claim 11, wherein to generate a second animation is to generate a second animation in a second format, the second animation comprising (a) one or more components that correspond to the plurality of graphical components, (b) one or more animation instructions, and (c) one or more interaction instructions associated with at least one of the one or more components that correspond to the plurality of graphical components.

13. The system of claim 10, wherein to processing the first animation is to process the first animation to identify, with respect to at least one of the plurality of graphical components, one or more operational characteristics, and wherein to generate a second animation is to generate, based on the first animation, the one or more animation instructions, and the one or more operational characteristics, a second animation in a second format, the second animation comprising (a) one or more components that correspond to the plurality of graphical components, (b) one or more animation instructions, and (c) one or more operational instructions associated with at least one of the one or more components that correspond to the at least one of the plurality of graphical components.

14. The system of claim 10, wherein to generate a second animation is to:

compress at least one of (a) the one or more components that correspond to the plurality of graphical components or (b) the one or more animation instructions into a binary zip file; and encode the binary zip file as base64 text;

wherein at least one of (a) the one or more components that correspond to the plurality of graphical components or (b) the one or more animation instructions comprise a text-compressed JSON object.

15. The system of claim 14, wherein the processing device is further to:

decompress the binary zip file to generate the second animation; and provide the second animation.

16. A non-transitory computer readable medium having instructions stored thereon that, when executed by a processing device, cause the processing device to perform operations comprising:

receiving a first animation in a first format, the first animation comprising a plurality of graphical components;

processing, by a processing device, the first animation to identify, with respect to the first animation, one or more animation instructions, one or more interaction parameters, one or more operational characteristics, and one or more navigational characteristics the one or more navigational characteristics comprising a quantity of frames of the first animation that correspond to a navigational unit within a game;

based on the first animation, the one or more animation instructions, the one or more interaction parameters, the one or more operational characteristics, and the one or more navigational characteristics, generating a second animation in a second format, the second animation comprising (a) one or more components that correspond to the plurality of graphical components (b) the one or more animation instructions, (c) one or more interaction instructions that correspond to the one or more interaction parameters, (d) one or more operational instructions that correspond to the one or more operational characteristics, and (e) one or more navigational instructions that correspond to the one or more navigational characteristics;

generating, based on the one or more navigational characteristics, one or more navigational instructions that synchronize a progression of the second animation with navigation within the game; and presenting at least one of the one or more components of the second animation based on at least one of (a) the one or more animation instructions, (b) the one or more interaction instructions that correspond to the one or more interaction parameters, (c) the one or more operational instructions that correspond to the one or more operational characteristics, or (d) the one or more navigational instructions that correspond to the one or more navigational characteristics.

* * * * *